United States Patent
Ichiki

(10) Patent No.: US 9,696,045 B2
(45) Date of Patent: Jul. 4, 2017

(54) AIR CONDITIONER AND CONTROL METHOD OF AIR CONDITIONER

(71) Applicant: Mitsubishi Electric Corporation, Tokyo (JP)

(72) Inventor: Satoru Ichiki, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 358 days.

(21) Appl. No.: 14/496,130

(22) Filed: Sep. 25, 2014

(65) Prior Publication Data

US 2015/0184925 A1    Jul. 2, 2015

(30) Foreign Application Priority Data

Dec. 27, 2013   (JP) .................................. 2013-273363

(51) Int. Cl.
*F24F 1/14* (2011.01)
*F24F 1/20* (2011.01)
(Continued)

(52) U.S. Cl.
CPC .................. *F24F 1/14* (2013.01); *F24F 1/20* (2013.01); *F24F 11/008* (2013.01); *H02P 29/62* (2016.02);
(Continued)

(58) Field of Classification Search
CPC .............. Y02B 30/741; F25B 2500/31; F25B 2700/2106; F25B 2500/26;
(Continued)

(56) References Cited

U.S. PATENT DOCUMENTS

2003/0182956 A1* 10/2003 Kurita .................. F25B 49/025
                                                        62/228.1
2010/0162742 A1*  7/2010 Shimoda ................ F25B 13/00
                                                        62/238.6
(Continued)

FOREIGN PATENT DOCUMENTS

JP       H05-296527 A    11/1993
JP       H07-79573 A      3/1995
(Continued)

OTHER PUBLICATIONS

Office Action issued Nov. 17, 2015 in the corresponding JP application No. 2013-273363 (with partial English translation).
(Continued)

*Primary Examiner* — Jianying Atkisson
*Assistant Examiner* — Kun Kai Ma
(74) *Attorney, Agent, or Firm* — Posz Law Group, PLC

(57) ABSTRACT

An air conditioner including: a converter circuit that is on an electronic substrate and converts an alternating current to a direct current; an inverter circuit that is on the electronic substrate and converts a direct current converted by the converter circuit to an alternating current to operate a motor that drives a compressor; an inverter control circuit that is on the electronic substrate and drives the inverter circuit; and a temperature detector that detects an outside air temperature input to the inverter control circuit, wherein the inverter control circuit includes a locked energization control unit, and the locked energization control unit performs AC locked energization or DC locked energization on the motor in accordance with the outside air temperature detected by the temperature detector.

9 Claims, 2 Drawing Sheets

(51) Int. Cl.
  *F24F 11/00*   (2006.01)
  *H02P 29/62*   (2016.01)
  *H02P 29/68*   (2016.01)

(52) U.S. Cl.
  CPC ....... *H02P 29/68* (2016.02); *F24F 2011/0013* (2013.01); *F25B 2500/26* (2013.01); *F25B 2500/31* (2013.01); *F25B 2600/021* (2013.01); *F25B 2700/2106* (2013.01); *F25B 2700/21154* (2013.01); *Y02B 30/741* (2013.01)

(58) Field of Classification Search
  CPC ...... F25B 2600/021; F25B 2700/21154; F24F 2011/0013; H02P 29/68; H02P 29/62
  See application file for complete search history.

(56) References Cited

U.S. PATENT DOCUMENTS

| 2011/0070100 | A1* | 3/2011 | McSweeney | F04B 35/04 417/53 |
|---|---|---|---|---|
| 2011/0083450 | A1* | 4/2011 | Turner | F25B 31/004 62/56 |
| 2012/0023984 | A1* | 2/2012 | Sakai | F04B 39/121 62/126 |
| 2012/0144852 | A1* | 6/2012 | Wakuta | F25B 13/00 62/157 |
| 2012/0210742 | A1* | 8/2012 | Kato | F25B 13/00 62/159 |
| 2012/0227430 | A1* | 9/2012 | Takeuchi | F25B 49/02 62/228.1 |
| 2013/0180273 | A1* | 7/2013 | Hatakeyama | F04B 35/04 62/115 |
| 2013/0199224 | A1* | 8/2013 | Kato | F25B 49/02 62/159 |
| 2013/0269370 | A1* | 10/2013 | Hatakeyama | F25B 13/00 62/56 |
| 2013/0291578 | A1* | 11/2013 | Hatakeyama | F25B 49/025 62/230 |
| 2014/0223926 | A1 | 8/2014 | Hatakeyama et al. | |
| 2014/0230476 | A1* | 8/2014 | Yura | F25B 31/002 62/192 |
| 2014/0338379 | A1 | 11/2014 | Hatakeyama et al. | |

FOREIGN PATENT DOCUMENTS

| JP | H08-226714 A | 9/1996 |
|---|---|---|
| JP | H11-159467 A | 6/1999 |
| JP | 2005-326054 A | 11/2005 |
| JP | 2013-113476 A | 6/2013 |
| KR | 2001-0047575 A | 6/2001 |
| WO | 9929035 A1 | 6/1999 |
| WO | 2013046454 A1 | 4/2013 |
| WO | 2013088541 A1 | 6/2013 |

OTHER PUBLICATIONS

Office Action issued Nov. 13, 2015 in the corresponding CA application No. 2,865,319.

Extended European Search Report mailed Sep. 22, 2015 in the corresponding EP application No. 14187530.2.

Office Action dated Feb. 19, 2016 issued in corresponding RU patent application No. 2014139657/12(064236) (and English translation).

Office Action dated Aug. 25, 2016 issued in corresponding CA patent application No. 2,865,319.

* cited by examiner

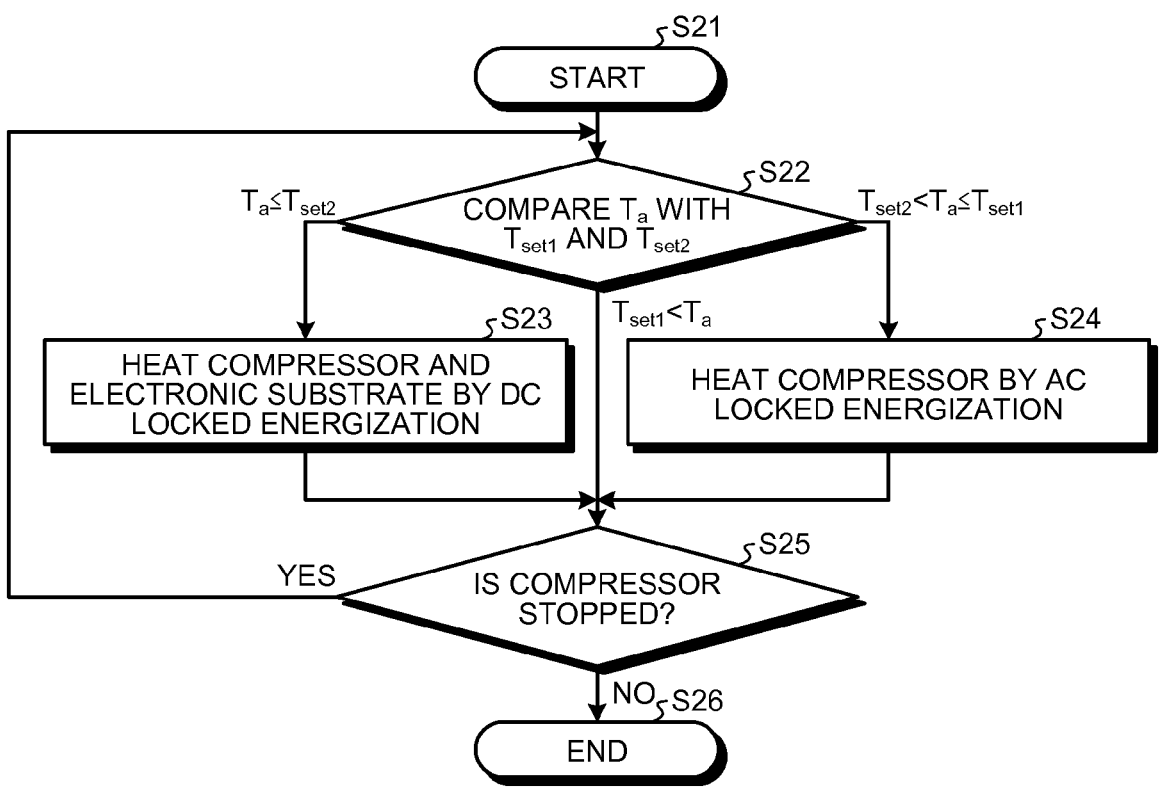

AIR CONDITIONER AND CONTROL METHOD OF AIR CONDITIONER

BACKGROUND OF THE INVENTION

1. Field of the Invention

The present invention relates to an air conditioner and a control method of an air conditioner.

2. Description of the Related Art

For an electronic substrate mounted on an outdoor unit of an air conditioner, a guaranteed minimum temperature that guarantees its operation is set, and at a temperature under the guaranteed minimum temperature, an electronic component on the electronic substrate may malfunction and may be broken. As a measure against this problem, it can be considered to use an electronic component having a low guaranteed minimum temperature. However, if an electronic component having a low guaranteed minimum temperature is used, downsizing is hindered or cost increases. It can be considered to attach a heater to the electronic component. However, in this case, downsizing is hindered because of the heater and cost and power consumption increase.

Furthermore, in an outdoor unit of an air conditioner under a low-temperature environment, "stagnation" of a refrigerant may occur while a compressor is stopped because of accumulation of the refrigerant in the compressor. When "stagnation" of the refrigerant occurs, a load at the time of startup of the compressor increases, and thus problems such as breakage of the compressor, breakage of the electronic component due to increase of a starting current, or failure to start the compressor due to system abnormality may occur. As a measure against these problems, it can be considered to install a heater in the compressor to perform appropriate heating or to preheat the compressor by locked energization of an electric motor under a condition in which the electric motor of the compressor is not rotated.

Locked energization is broadly divided into DC locked energization and AC locked energization. In the DC locked energization, heat is generated by a loss of a resistance component of a winding of a compressor electric motor (for example, Japanese Patent Application Laid-open No. H8-226714). In the AC locked energization, heat is generated by a loss of a reactance component of a winding of a compressor electric motor (for example, Japanese Patent Application Laid-open No. H11-159467).

However, according to these conventional techniques, in the DC locked energization, because the resistance component of the winding of the compressor electric motor is used, a large current is required to obtain a sufficient amount of heat generation, the loss is large, and thus power efficiency is poor. On the other hand, in the AC locked energization, because the reactance component of the winding of the compressor electric motor is used, when an AC current of a high frequency is applied, the amount of heat to keep the compressor warm can be obtained with a small current. However, because the degree of temperature increase is lower than the DC locked energization, a long time is required to supply a sufficient amount of heat to keep the compressor warm under an extremely low temperature environment. Therefore, even if the locked energization is used, power consumption increases or a long time is required to reach an intended temperature.

The present invention has been achieved in view of the above problems, and an object of the present invention is to provide an air conditioner for which cost and power consumption are suppressed without increasing the size of the air conditioner, even in a case where stagnation of a refrigerant occurs and the air conditioner is installed in a low temperature environment, in which the temperature falls below a guaranteed minimum temperature of an electronic component.

SUMMARY OF THE INVENTION

It is an object of the present invention to at least partially solve the problems in the conventional technology.

According to an aspect of the present invention, an air conditioner including: a converter circuit that is on an electronic substrate and converts an alternating current to a direct current; an inverter circuit that is on the electronic substrate and converts a direct current converted by the converter circuit to an alternating current to operate a motor that drives a compressor; an inverter control circuit that is on the electronic substrate and drives the inverter circuit; and a temperature detector that detects an outside air temperature input to the inverter control circuit, wherein the inverter control circuit includes a locked energization control unit, and the locked energization control unit performs AC locked energization or DC locked energization on the motor in accordance with the outside air temperature detected by the temperature detector.

According to another aspect of the present invention, a control method of an air conditioner that includes a converter circuit that is on an electronic substrate and converts an alternating current to a direct current, an inverter circuit that is on the electronic substrate and converts a direct current converted by the converter circuit to an alternating current to operate a motor that drives a compressor, an inverter control circuit that is on the electronic substrate and drives the inverter circuit, and a temperature detector that detects an outside air temperature input to the inverter control circuit, the method being performed by a locked energization control unit included in the inverter control circuit and including: determining whether the outside air temperature is equal to or lower than a first set temperature; repeating, when the outside air temperature is higher than the first set temperature, the determining until the outside air temperature becomes equal to or lower than the first set temperature; determining, when the outside air temperature is equal to or lower than the first set temperature, whether the outside air temperature is equal to or lower than a second set temperature; heating, when the outside air temperature is equal to or lower than the first set temperature and is equal to or lower than the second set temperature, both the compressor and the electronic substrate by DC locked energization; and heating, when the outside air temperature is equal to or lower than the first set temperature and is higher than the second set temperature, the compressor by AC locked energization.

According to still another aspect of the present invention, a control method of an air conditioner that includes a converter circuit that is on an electronic substrate and converts an alternating current to a direct current, an inverter circuit that is on the electronic substrate and converts a direct current converted by the converter circuit to an alternating current to operate a motor that drives a compressor, an inverter control circuit that is on the electronic substrate and drives the inverter circuit, and a temperature detector that detects an outside air temperature input to the inverter control circuit, the method being performed by a locked energization control unit included in the inverter control circuit and including: comparing the outside air temperature with a first set temperature and a second set temperature that is lower than the first set temperature; heating, when the outside air temperature is equal to or lower than the second set temperature, both the compressor and the electronic substrate by DC locked energization; and heating, when the outside air temperature is higher than the second set temperature and is equal to or lower than the first set temperature, the compressor by AC locked energization.

BRIEF DESCRIPTION OF THE DRAWINGS

FIG. 3 is a flowchart showing an operation of the locked energization control unit while the compressor in the air conditioner according to the embodiment is stopped.

DETAILED DESCRIPTION OF THE PREFERRED EMBODIMENTS

Exemplary embodiments of an air conditioner according to the present invention will be explained below in detail with reference to the drawings. The present invention is not limited to the embodiments.
Embodiment.

Figure 1:
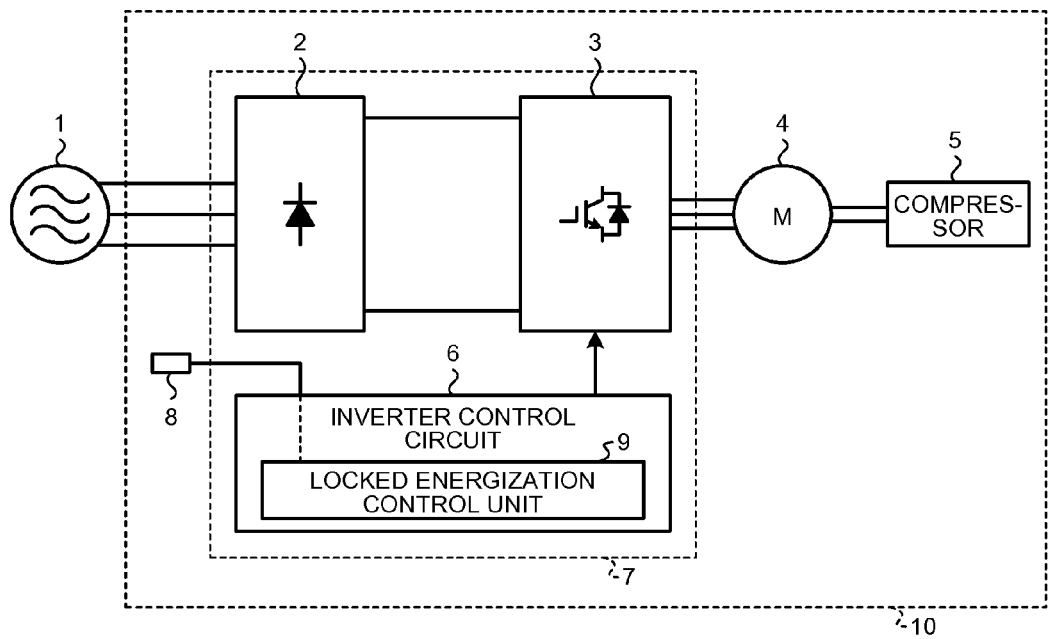
FIG. 1 is a diagram showing the configuration of an outdoor unit of an air conditioner according to an embodiment.

FIG. 1 is a diagram showing the configuration of an outdoor unit of an air conditioner according to an embodiment of the present invention. FIG. 1 shows an outdoor unit 10, which is connected to an AC power supply 1 and includes a motor 4, a compressor 5, an electronic substrate 7, and a temperature detector 8. The outdoor unit 10 and an indoor unit (not shown) are connected to each other by a refrigerant pipe.

As the AC power supply 1, a single-phase AC power supply or three-phase AC power supply may be used. However, a three-phase AC power supply is exemplified here. The motor 4 is a motor that drives the compressor 5. The compressor 5 is a compressor in a refrigeration cycle driven by the motor 4 and transports heat by the refrigerant in the refrigeration cycle. For example, rotary motion of the motor 4 only needs to be converted to reciprocal motion to compress the refrigerant in the compressor 5. The electronic substrate 7 is an electronic substrate that includes a converter circuit 2, an inverter circuit 3, and an inverter control circuit 6. For example, the converter circuit 2 only needs to be constituted by a rectifier circuit formed by connecting diode elements in a bridge configuration, and the converter circuit 2 converts an alternating current from the AC power supply 1 to a direct current. For example, the inverter circuit 3 only needs to be constituted by a plurality of switching elements and diode elements, and the inverter circuit 3 converts a direct current converted by the converter circuit 2 to an alternating current of a predetermined frequency. The frequency of the alternating current is set, for example, to 10 kHz or higher. The inverter control circuit 6 drives the inverter circuit 3. The temperature detector 8 detects an outside air temperature, and the detected outside air temperature is used for drive control of the compressor 5.

The inverter control circuit 6 includes a locked energization control unit 9. The outside air temperature detected by the temperature detector 8 is input to the locked energization control unit 9, and the locked energization control unit 9 executes control of locked energization with respect to the winding of the motor 4. The locked energization is performed without operating the motor 4 and the compressor 5.

Figure 2:
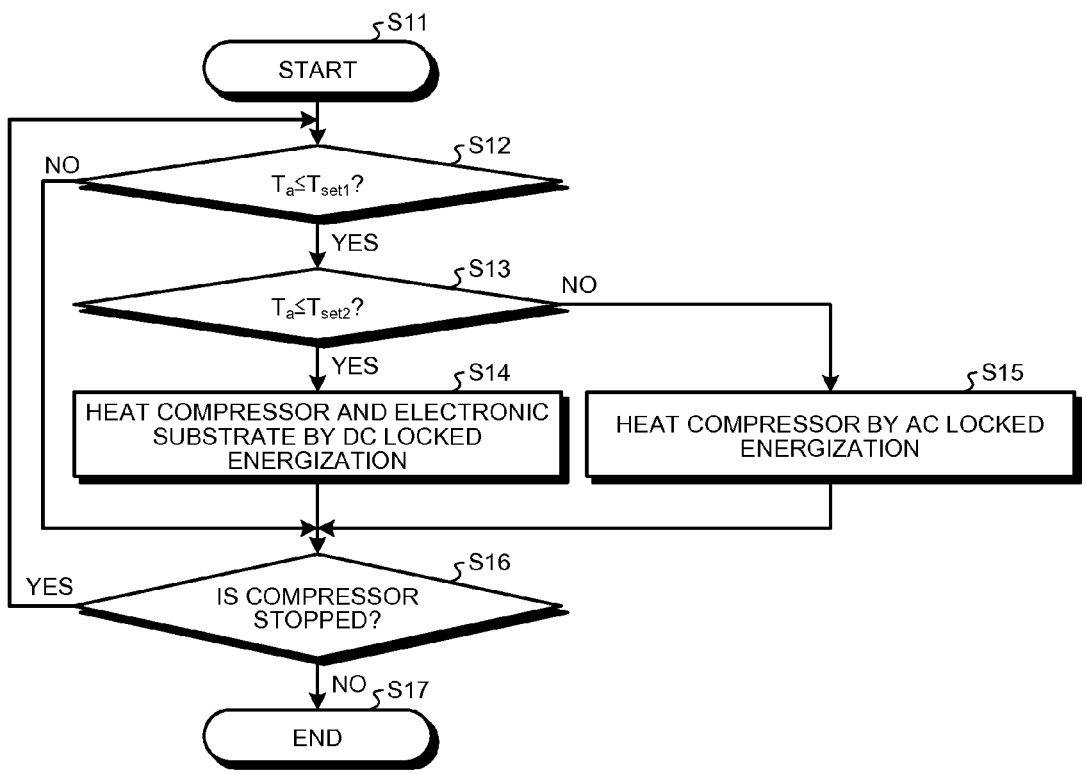
FIG. 2 is a flowchart showing an operation of a locked energization control unit while a compressor in the air conditioner according to the embodiment is stopped.

FIG. 2 is a flowchart showing an operation of the locked energization control unit 9 while the compressor is stopped. First, the process is started (Step S11), and it is determined whether an outside air temperature $T_a$ is equal to or lower than a first set temperature $T_{set1}$ (Step S12). When the outside air temperature $T_a$ is equal to or lower than the first set temperature $T_{set1}$ (when YES is determined at Step S12), it is then determined whether the outside air temperature $T_a$ is equal to or lower than a second set temperature $T_{set2}$ (Step S13). When the outside air temperature $T_a$ is equal to or lower than the first set temperature $T_{set1}$ and is equal to or lower than the second set temperature $T_{set2}$ (when YES is determined at Step S12 and Step S13), both the compressor 5 and the electronic substrate 7 are heated by the DC locked energization (Step S14). When the outside air temperature $T_a$ is equal to or lower than the first set temperature $T_{set1}$ and is higher than the second set temperature $T_{set2}$ (when YES is determined at Step S12 and NO is determined at Step S13), the compressor 5 is heated by the AC locked energization (Step S15). Heating at Steps S14 and S15 only needs to be performed for a predetermined time. It is then determined whether the compressor 5 is stopped after the heating process (Step S16). Even when the outside air temperature $T_a$ is higher than the first set temperature $T_{set1}$ (when No is determined at Step S12), it is determined whether the compressor 5 is stopped (Step S16). When the compressor 5 is stopped (when YES is determined at Step S16), the process returns to Step S12 and it is determined whether the outside air temperature $T_a$ is equal to or lower than the first set temperature $T_{set1}$. When the compressor 5 is not stopped (when No is determined at Step S16), the process ends (Step S17).

It is assumed that the first set temperature $T_{set1}$ is an upper limit temperature at which "stagnation" of the refrigerant occurs (for example, $T_{set1}=25°$ C. or higher). If the outside air temperature $T_a$ is equal to or lower than the first set temperature $T_{set1}$, "stagnation" of the refrigerant occurs and the load at the time of startup of the compressor increases, thereby, in some cases, causing problems such as breakage of the compressor, breakage of an electronic component due to increase of the starting current, or failure to start the compressor due to system abnormality. It can be considered to attach a heater to the compressor against these problems. However, the size of the air conditioner increases because of the heater and cost and power consumption increase.

Accordingly, when the outside air temperature $T_a$ is equal to or lower than the first set temperature $T_{set1}$, it is only necessary to perform the AC locked energization. The AC locked energization is performed by driving the inverter circuit 3 to apply an AC current of a high frequency to the winding of the motor 4. A refrigerant stagnation phenomenon can be avoided by the AC locked energization.

It is assumed that the second set temperature $T_{set2}$ is lower than the first set temperature $T_{set1}$ and is a guaranteed minimum temperature of the electronic substrate 7 (for example, $T_{set2}=-25°$ C. or lower). If the outside air temperature $T_a$ is equal to or lower than the second set temperature $T_{set2}$, an electronic component on the electronic substrate 7 may malfunction and may be broken. As a measure against this problem, it can be considered to use an electronic component having a low guaranteed minimum temperature. However, if an electronic component having a low guaranteed minimum temperature is used, downsizing may be hindered and cost increases in many cases.

Alternatively, it can be considered to attach a heater to the electronic component. However, in this case, the air conditioner becomes large because of the heater and cost and power consumption increase.

Accordingly, when the outside air temperature $T_a$ is equal to or lower than the second set temperature $T_{set2}$, the DC locked energization only needs to be performed. The DC locked energization is performed by driving the inverter circuit 3 to apply a DC current to the winding of the motor 4. By the DC locked energization, it is possible not only to avoid the refrigerant stagnation phenomenon but also to perform preheating of an ambient temperature of the electronic substrate 7 by self-heating of the electronic component on the electronic substrate 7.

In this manner, the operation of the air conditioner can be made appropriate to the outside air temperature by selectively using the AC locked energization and the DC locked energization. That is, while suppressing the power consumption, stagnation of the refrigerant can be suppressed, and the electronic component on the electronic substrate can be prevented from malfunctioning and being broken.

The control method of the air conditioner according to the present invention is not limited to the mode described above. For example, a determination using the outside air temperature $T_a$, the first set temperature $T_{set1}$, and the second set temperature $T_{set2}$ may be performed at a time. It is set such that the second set temperature $T_{set2}$ is lower than the first set temperature $T_{set1}$.

FIG. 3 is a flowchart showing an operation of the locked energization control unit 9 while a compressor is stopped. First, the process is started (Step S21), and the outside air temperature $T_a$ is compared with the first set temperature $T_{set1}$ and the second set temperature $T_{set2}$ (Step S22). Because the second set temperature $T_{set2}$ is lower than the first set temperature $T_{set1}$, the temperature range of the outside air temperature $T_a$ is divided into three regions, that is, a case where $T_a \leq T_{set2}$ (a case where the outside air temperature $T_a$ is extremely low), a case where $T_{set2} < T_a \leq T_{set1}$ (a case where the outside air temperature $T_a$ is low), and a case where $T_{set1} < T_a$ (a case where the outside air temperature $T_a$ is not low). In the case where $T_a \leq T_{set2}$ (when the outside air temperature $T_a$ is extremely low), both the compressor 5 and the electronic substrate 7 are heated by the DC locked energization as at Step S14 (Step S23). In the case where $T_{set2} < T_a \leq T_{set1}$ (when the outside air temperature $T_a$ is low), the compressor 5 is heated by the AC locked energization as at Step S15 (Step S24). Heating at Steps S23 and S24 only needs to be performed for a predetermined time. After heating or in the case where $T_{set1} < T_a$ (when the outside air temperature $T_a$ is not low), it is determined whether the compressor 5 is stopped as at Step S16 (Step S25). When the compressor 5 is stopped (when YES is determined at Step S25), the process returns to Step S22 and the outside air temperature $T_a$ is compared with the first set temperature $T_{set1}$ and the second set temperature $T_{set2}$ (Step S22). When the compressor 5 is not stopped (when NO is determined at Step S25), the process ends (Step S26).

In this manner, a comparison of the outside air temperature $T_a$ with the first set temperature $T_{set1}$ and the second set temperature $T_{set2}$ may be performed at a time.

As described above, the present invention relates to an air conditioner including: a converter circuit that is on an electronic substrate and converts an alternating current to a direct current; an inverter circuit that is on the electronic substrate and converts a direct current converted by the converter circuit to an alternating current to operate a motor that drives a compressor; an inverter control circuit that is on the electronic substrate and drives the inverter circuit; and a temperature detector that detects an outside air temperature input to the inverter control circuit, wherein the inverter control circuit includes a locked energization control unit, and the locked energization control unit performs AC locked energization or DC locked energization on the motor in accordance with the outside air temperature detected by the temperature detector, thereby performing heating.

According to the air conditioner, specifically, the outside air temperature is divided into three temperature ranges by a first set temperature and a second set temperature that is lower than the first set temperature, and it is only necessary to perform heating by the DC locked energization when the outside air temperature is equal to or lower than the second set temperature and perform heating by the AC locked energization when the outside air temperature is higher than the second set temperature and is equal to or lower than the first set temperature. With such a configuration, the size of the air conditioner does not become large and cost and power consumption are suppressed.

Furthermore, the present invention relates to a control method of an air conditioner that includes a converter circuit that is on an electronic substrate and converts an alternating current to a direct current, an inverter circuit that is on the electronic substrate and converts a direct current converted by the converter circuit to an alternating current to operate a motor that drives a compressor, an inverter control circuit that is on the electronic substrate and drives the inverter circuit, and a temperature detector that detects an outside air temperature input to the inverter control circuit, the method being performed by a locked energization control unit included in the inverter control circuit and including: determining whether the outside air temperature is equal to or lower than a first set temperature; repeating, when the outside air temperature is higher than the first set temperature, the determining until the outside air temperature becomes equal to or lower than the first set temperature; determining, when the outside air temperature is equal to or lower than the first set temperature, whether the outside air temperature is equal to or lower than a second set temperature; heating, when the outside air temperature is equal to or lower than the first set temperature and is equal to or lower than the second set temperature, both the compressor and the electronic substrate by DC locked energization; and heating, when the outside air temperature is equal to or lower than the first set temperature and is higher than the second set temperature, the compressor by AC locked energization.

Furthermore, the present invention relates to a control method of an air conditioner that includes a converter circuit that is on an electronic substrate and converts an alternating current to a direct current, an inverter circuit that is on the electronic substrate and converts a direct current converted by the converter circuit to an alternating current to operate a motor that drives a compressor, an inverter control circuit that is on the electronic substrate and drives the inverter circuit, and a temperature detector that detects an outside air temperature input to the inverter control circuit, the method being performed by a locked energization control unit included in the inverter control circuit and including: comparing the outside air temperature with a first set temperature and a second set temperature that is lower than the first set temperature; heating, when the outside air temperature is equal to or lower than the second set temperature, both the compressor and the electronic substrate by DC locked energization; and heating, when the outside air temperature is higher than the second set temperature and is equal to or lower than the first set temperature, the compressor by AC locked energization. In this manner, a comparison of the outside air temperature with the first set temperature and the second set temperature may be performed at a time.

In the air conditioner and the control method of the air conditioner, it is only necessary to set the first set temperature to an upper limit temperature at which refrigerant stagnation occurs. Accordingly, refrigerant stagnation can be prevented.

In the air conditioner and the control method of the air conditioner, it is only necessary to set the second set temperature to a guaranteed minimum temperature of the electronic substrate. Accordingly, an electronic component on the electronic substrate can be prevented from malfunctioning and being broken.

According to the present invention, an effect is obtained where an air conditioner for which cost and power consumption are suppressed can be obtained without increasing the size of the air conditioner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An air conditioner comprising:
    a converter circuit that is on an electronic substrate and converts an alternating current to a direct current;
    an inverter circuit that is on the electronic substrate and converts the direct current converted by the converter circuit to an alternating current to operate a motor that drives a compressor;
    an inverter control circuit that is on the electronic substrate and drives the inverter circuit; and
    a temperature detector that detects an outside air temperature input to the inverter control circuit, wherein
    the inverter control circuit includes a locked energization control unit, and
    the locked energization control unit configured to selectively perform one of AC locked energization and DC locked energization on the motor in accordance with the outside air temperature detected by the temperature detector,
    the locked energization control unit is configured to divide the outside air temperature into three temperature ranges by a first set temperature and a second set temperature that is lower than the first set temperature,
    the locked energization control unit is configured to control heating to both the compressor and the electronic substrate by the DC locked energization in response to the outside air temperature being equal to or lower than the second set temperature, and
    the locked energization control unit is configured to control heating to the compressor by the AC locked energization in response to the outside air temperature being higher than the second set temperature and is equal to or lower than the first set temperature.

2. The air conditioner according to claim 1, wherein the first set temperture is an upper limit temperature at which refrigerant stagnation occurs.

3. The air conditioner according to claim 1, wherein the second set temperature is a guaranteed minimum temperature of the electronic substrate that ensures operation of the electric substrate.

4. A control method of an air conditioner that includes a converter circuit that is on an electronic substrate and converts an alternating current to a direct current, an inverter circuit that is on the electronic substrate and converts the direct current converted by the converter circuit to an alternating current to operate a motor that drives a compressor, an inverter control circuit that is on the electronic substrate and drives the inverter circuit, and a temperature detector that detects an outside air temperature input to the inverter control circuit, the method being performed by a locked energization control unit included in the inverter control circuit and comprising:
    determining whether the outside air temperature is equal to or lower than a first set temperature;
    repeating, when the outside air temperature is higher than the first set temperature, the determining until the outside air temperature becomes equal to or lower than the first set temperature;
    determining, when the outside air temperature is equal to or lower than the first set temperature, whether the outside air temperature is equal to or lower than a second set temperature;
    heating, when the outside air temperature is equal to or lower than the first set temperature and is equal to or lower than the second set temperature, both the compressor and the electronic substrate by DC locked energization; and
    heating, when the outside air temperature is equal to or lower than the first set temperature and is higher than the second set temperature, the compressor by AC locked energization.

5. The control method of an air conditioner according to claim 4, wherein the first set temperature is an upper limit temperature at which refrigerant stagnation occurs.

6. The control method of an air conditioner according to claim 4, wherein the second set temperature is a guaranteed minimum temperature of the electronic substrate that ensures operation of the electric substrate.

7. A control method of an air conditioner that includes a converter circuit that is on an electronic substrate and converts an alternating current to a direct current, an inverter circuit that is on the electronic substrate and converts the direct current converted by the converter circuit to an alternating current to operate a motor that drives a compressor, an inverter control circuit that is on the electronic substrate and drives the inverter circuit, and a temperature detector that detects an outside air temperature input to the inverter control circuit, the method being performed by a locked energization control unit included in the inverter control circuit and comprising:
    comparing the outside air temperature with a first set temperature and a second set temperature that is lower than the first set temperature;
    heating, when the outside air temperature is equal to or lower than the second set temperature, both the compressor and the electronic substrate by DC locked energization; and
    heating, when the outside air temperature is higher than the second set temperature and is equal to or lower than the first set temperature, the compressor by AC locked energization.

8. The control method of an air conditioner according to claim 7, wherein the first set temperature is an upper limit temperature at which refrigerant stagnation occurs.

9. The control method of an air conditioner according to claim 7, wherein the second set temperature is a guaranteed minimum temperature of the electronic substrate that ensures operation of the electric substrate.

* * * * *